(12) United States Patent
Kriel et al.

(10) Patent No.: US 9,167,214 B2
(45) Date of Patent: Oct. 20, 2015

(54) IMAGE PROCESSING SYSTEM USING UNIFIED IMAGES

(71) Applicant: Caterpillar Inc., Peoria, IL (US)

(72) Inventors: Bradley Scott Kriel, Pittsburgh, PA (US); Daniel Morris, Pittsburgh, PA (US); Hong Chang, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 377 days.

(21) Appl. No.: 13/745,641

(22) Filed: Jan. 18, 2013

(65) Prior Publication Data

US 2014/0204215 A1      Jul. 24, 2014

(51) Int. Cl.
*H04N 7/18*         (2006.01)
*G01S 13/86*        (2006.01)
*G01S 13/93*        (2006.01)

(52) U.S. Cl.
CPC .............. *H04N 7/181* (2013.01); *G01S 13/867* (2013.01); *G01S 13/931* (2013.01)

(58) Field of Classification Search
CPC ........................... G60K 9/00805; H04N 7/183
USPC ........................................................ 348/148
See application file for complete search history.

(56) References Cited

U.S. PATENT DOCUMENTS

| | | | |
|---|---|---|---|
| 7,042,508 B2 | 5/2006 | Jan et al. | |
| 7,376,247 B2 | 5/2008 | Ohta et al. | |
| 7,570,198 B2 | 8/2009 | Tokoro | |
| 7,756,298 B2 | 7/2010 | Miyahara et al. | |
| 7,777,669 B2 | 8/2010 | Tokoro et al. | |
| 8,068,134 B2 | 11/2011 | Yoshizawa | |
| 2002/0191078 A1 | 12/2002 | Okamoto et al. | |
| 2004/0178945 A1 | 9/2004 | Buchanan | |
| 2007/0299584 A1* | 12/2007 | Okamoto et al. | 701/41 |
| 2011/0050482 A1 | 3/2011 | Nanami | |
| 2011/0074916 A1 | 3/2011 | Demirdjian | |
| 2011/0184617 A1 | 7/2011 | Hegemann et al. | |

(Continued)

FOREIGN PATENT DOCUMENTS

| | | |
|---|---|---|
| CN | 102508398 | 6/2012 |
| EP | 1 634 243 B1 | 3/2006 |

(Continued)

OTHER PUBLICATIONS

U.S. Patent Application of Brad Scott Kriel et al., entitled "Object Recognition System Having Radar and Camera Input" filed Jan. 18, 2013, U.S. Appl. No. 13/745,633.

(Continued)

*Primary Examiner* — Michael Lee
(74) *Attorney, Agent, or Firm* — Finnegan, Henderson, Farabow, Garrett & Dunner, LLP (57) ABSTRACT

An image processing system has a plurality of cameras and a display that are mounted on a machine. The plurality of cameras are configured to generate image data for an environment of the machine. The image processing system also has a processor connected to the plurality of cameras and the display. The processor is configured to access the image data from the plurality of cameras, access parameters associated with the plurality of cameras, generate a unified image by combining the image data from the plurality of cameras based at least in part on the parameters, access state data associated with the machine, select a portion of the unified image based at least in part on the state data, and render the portion of the unified image on the display.

20 Claims, 6 Drawing Sheets

(56) References Cited

U.S. PATENT DOCUMENTS

| | | |
|---|---|---|
| 2012/0262580 A1 | 10/2012 | Huebner et al. |
| 2013/0147958 A1* | 6/2013 | Mitsuta et al. ................ 348/148 |
| 2015/0070498 A1* | 3/2015 | Kriel ............................. 348/148 |

FOREIGN PATENT DOCUMENTS

| | | |
|---|---|---|
| EP | 1 847 849 A2 | 10/2007 |
| JP | 2010171914 | 8/2010 |
| JP | 2011210232 | 10/2011 |
| WO | WO 2012169352 A1 * | 12/2012 |

OTHER PUBLICATIONS

U.S. Patent Application of Brad Scott Kriel et al., entitled "Object Recognition System Implementing Image Data Transformation" filed Jan. 18, 2013, U.S. Appl. No. 13/745,637.

* cited by examiner

IMAGE PROCESSING SYSTEM USING UNIFIED IMAGES

TECHNICAL FIELD

The present disclosure relates generally to an image processing system, and more particularly, to an image processing system using unified images.

BACKGROUND

Various machines, such as those that are used to dig, loosen, carry, compact, etc., different materials, may be equipped with image processing systems including cameras. The cameras capture images of the environment around the machine, and the image processing systems render the images on a display within the machine. Such image processing systems may assist the operators of the machines by increasing visibility and may be beneficial in applications where the operators' field of view is obstructed by portions of the machine or other obstacles.

One problem with current image processing systems is that they present images from cameras simultaneously as several independent images on one display or on several independent displays. While improving visibility, such systems may not assist operators in operating machines safely. As images from all cameras are being shown simultaneously, it may be difficult for the operator to steer the machine and pay attention to all displays concurrently. As a result, an operator may not see an object in the environment of the machine that has been captured by the image processing system, and a collision may result.

A system that may be used to improve visibility is disclosed in U.S. Patent Application Publication 2012/0262580 to Huebner at al., which published Oct. 18, 2012 (the '580 Publication). The system of the '580 Publication provides a surround view from a vehicle by way of cameras positioned at various locations on the vehicle. The cameras can generate image data corresponding to the surround view, and a processing device can process the image data and generate the surround view on a simulated predetermined shape that can be viewed from a display. The simulated predetermined shape can have a flat bottom with a rectangular shape and a rim with a parabolic shape. Although the system of the '580 Publication may increase visibility, it does not necessarily increase safety as the entire surround view is displayed.

The disclosed systems and methods are directed to overcoming one or more of the problems set forth above and/or other problems of the prior art.

SUMMARY

In one aspect, the present disclosure is directed to an image processing system including a plurality of cameras and a display mounted on a machine. The plurality of cameras may be configured to generate image data for an environment of the machine. The image processing system also includes a processor connected to the plurality of cameras and the display. The processor may be configured to access the image data from the plurality of cameras, access parameters associated with the plurality of cameras, generate a unified image by combining the image data from the plurality of cameras based at least in part on the parameters, access state data associated with the machine, select a portion of the unified image based at least in part on the state data, and render the selected portion of the unified image on the display.

In another aspect, the present disclosure is directed to a method of processing an image including accessing image data from a plurality of cameras mounted on a machine, accessing parameters associated with the plurality of cameras, generating a unified image by combining the image data from the plurality of cameras based on the parameters, accessing state data associated with the mobile machine, selecting a portion of the unified image data based at least in part on the state data, and rendering the selected portion of the unified image on a display mounted on the machine.

DETAILED DESCRIPTION

Figure 1:
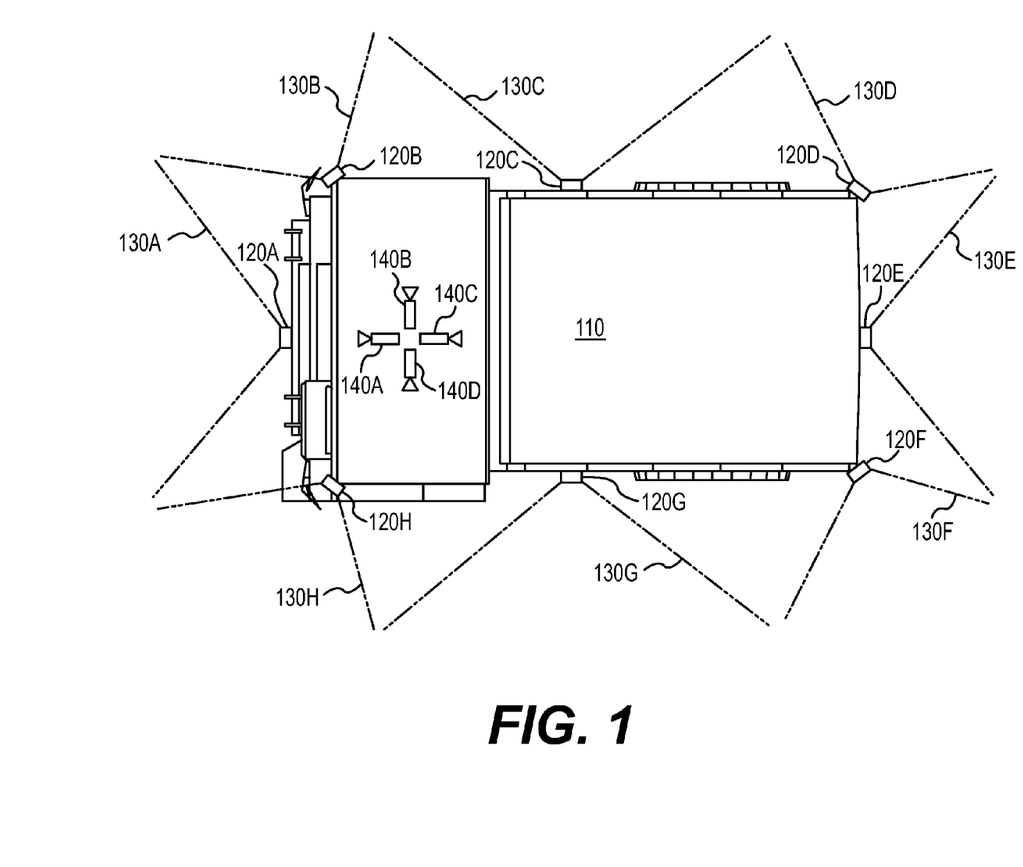
FIG. 1 is a pictorial illustration of an exemplary disclosed machine.

FIG. 1 illustrates an exemplary machine 110 having multiple systems and components that cooperate to accomplish a task. Machine 110 may embody a fixed or mobile machine that performs some type of operation associated with an industry such as mining, construction, farming, transportation, or any other industry known in the art. For example, machine 110 may be an earth moving machine such as an excavator, a dozer, a loader, a backhoe, a motor grader, a dump truck, or any other earth moving machine. Machine 110 may include one or more radar devices 120a-120h and cameras 140a-140d. Radar devices 120a-120h and cameras 140a-140d may be operational on machine 110 during operation of machine 110, e.g., as machine 110 moves about an area to complete certain tasks such as digging, loosening, carrying, drilling, or compacting different materials.

Machine 110 may use radar devices 120a-120h to detect objects in their respective fields of view 130a-130h. For example, radar device 120a may be configured to scan an area within field of view 130a to detect the presence of one or more objects. During operation, one or more systems of machine 110 (not shown) may process radar data received from radar device 120a to detect objects that are in the environment of machine 110. For example, a collision avoidance system may use radar data to control machine 110 to prevent it from colliding with objects in its path. Moreover, one or more systems of machine 110 may generate an alert, such as a sound, when an object is detected in the environment of machine 110. Cameras 140a-140d may be attached to the frame of machine 110 at a high vantage point. For example, cameras 140a-140d may be attached to the top of the frame of the roof of machine 110. Machine 110 may use cameras 140a-140d to detect objects in their respective fields of view. For example, cameras 140a-140d may be configured to record image data such as video or still images.

During operation, one or more systems of machine 110 (not shown) may render the image data on a display of machine 110 and/or may process the image data received from the cameras to detect objects that are in the environment of machine 110. For example, when the one or more systems of machine 110 detect an object in the image data, the image data may be rendered on the display. According to some embodiments, the one or more systems of machine 110 may render an indication of the location of the detected object within the image data. For example, the one or more systems of machine 110 may render a colored box around the detected object, or render text below, above, or to the side of the detected object.

While machine 110 is shown having eight radar devices 120a-120h, and four cameras 140a-140d, those skilled in the art will appreciate that machine 110 may include any number of radar devices and cameras arranged in any manner. For example, machine 110 may include four radar devices on each side of machine 110.

Figure 2:
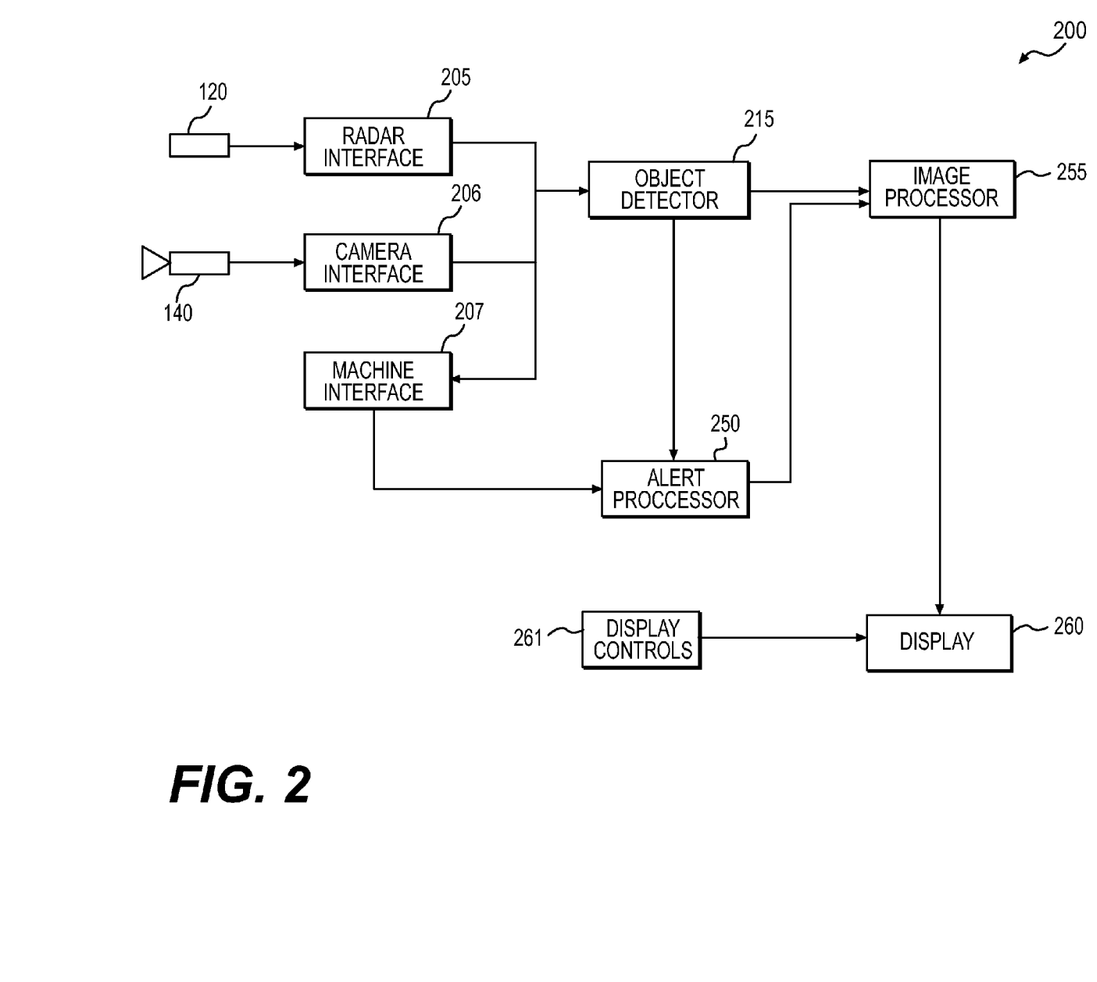
FIG. 2 is a block diagram illustrating an exemplary image processing system for the machine of FIG. 1.

FIG. 2 is a block diagram illustrating an exemplary image processing system 200 that may by installed on machine 110 to capture and process image data in the environment of machine 110. Image processing system 200 may include one or more modules that when combined perform image processing, image rendering, and object detection. For example, as illustrated in FIG. 2, image processing system 200 may include radar interface 205, camera interface 206, machine interface 207, object detector 215, alert processor 250, and image processor 255. While FIG. 2 shows the components of image processing system 200 as separate blocks, those skilled in the art will appreciate that the functionality described below with respect to one component may be performed by another component, or that the functionality of one component may be performed by two or more components. For example, the functionality of alert processor 250 may be performed by object detector 215 or the functionality of image processor 255 may be performed by two components.

According to some embodiments, the modules of image processing system 200 may include logic embodied as hardware, firmware, or a collection of software written in a programming language. The modules of image processing system 200 may be stored in any type of computer-readable medium, such as a memory device (e.g., random access, flash memory, and the like), an optical medium (e.g., a CD, DVD, BluRay®, and the like), firmware (e.g., an EPROM), or any other storage medium. The modules may be configured for execution by one or more processors to cause image processing system 200 to perform particular operations. The modules of the image processing system 200 may also be embodied as hardware modules and may be comprised of connected logic units, such as gates and flip-flops, and/or may be comprised of programmable units, such as programmable gate arrays or processors, for example.

Image processing system 200 may include radar device 120 and camera 140. Radar device 120 may correspond to one or more of radar devices 120a-120h and camera 140 may correspond to one or more of cameras 140a-140d, for example. Moreover, while only one radar device 120 and one camera 140 are shown in FIG. 2, those skilled in the art will appreciate that any number of radar devices and cameras may be included in image processing system 200.

In some aspects, before the image processing system 200 can process radar data from radar device 120 and image data from camera 140, the radar data and the image data must be converted to a format that is consumable by the modules of image processing system 200. Accordingly, radar device 120 may be connected to radar interface 205, and camera 140 may be connected to camera interface 206. Radar interface 205 and camera interface 206 may receive analog signals from their respective devices and convert them to digital signals which may be processed by the other modules of image processing system 200. For example, radar interface 205 may create digital radar data using information it receives from radar device 120, and camera interface 206 may create digital image data using information it receives from camera 140. According to some embodiments, radar interface 205 and camera interface 206 may package the digital data in a data package or data structure along with metadata related to the converted digital data. For example, radar interface 205 may create a data structure or data package that has metadata and a payload. The payload may represent the radar data from radar device 120. Non-exhaustive examples of data included in the metadata related to the radar data may include the orientation of radar device 120, the position of radar device 120, and/or a time stamp for when the radar data was recorded. Similarly, camera interface 206 may create a data structure or data package that has metadata and a payload representing image data from camera 140. The metadata related to the image data may include parameters associated with camera 140 that captured the image data. Non-exhaustive examples of the parameters associated with camera 140 may include the orientation of camera 140, the position of camera 140 with respect to machine 110, the down-vector of camera 140, the range of the camera's field of view, a priority for image processing associated with camera 140, and a time stamp for when the image data was recorded. Parameters associated with the camera may be stored in a configuration file, database, data store, or some other computer readable medium accessible by camera interface 206. The parameters may be set by an operator prior to operation of machine 110.

In some embodiments, radar device 120 and camera 140 may be digital devices that produce digital data, and radar interface 205 and camera interface 206 may package the digital data into a data structure for consumption by the other modules of image processing system 200. Radar interface 205 and camera interface 206 may expose an application program interface (API) that exposes one or more function calls allowing the other modules of image processing system 200, such as object detector 215, to access the radar data and the image data.

In addition to radar interface 205 and camera interface 206, image processing system 200 may also include machine interface 207. Machine interface 207 may connect with one or more sensors deployed on machine 110 and may translate signals from the one or more sensors to digital data that may be consumed by the modules of image processing system 200. The digital data may include state data that includes information related to machine's 110 current operation. For example, the state data may include the current speed of machine 110, the current direction of machine 110 (e.g., forward or backward), the current steering angle of machine 110, or the acceleration of machine 110. The state data may also include information about tools or other work components of machine 110. For example, the state data may include the position of loading or digging arms, or the angle/position of a load bed attached to machine 110. The state data may also include metadata such as a time stamp or an identifier of the tool or work component to which the state data applies. Machine interface 207 may expose an API providing access to the state data of the machine 110 to the modules of image processing system 200, such as alert processor 250 and object detector 215.

Image processing system 200 may also include object detector 215. Object detector 215 accesses data from the radar interface 205 and the camera interface 206 and processes it to detect objects that are in the environment of machine 110. The radar data accessed from radar interface 205 may include an indication that an object was detected in the environment of the machine 110. Object detector 215 may access radar data by periodically polling radar interface 205 for radar data and analyzing the data to determine if the data indicates the presence of an object. Object detector 215 may also access radar data through an event or interrupt triggered by radar interface 205. For example, when radar device 120 detects an object, it may generate a signal that is received by radar interface 205, and radar interface 205 may publish an event to its API indicating that radar device 120 has detected an object. Object detector 215, having registered for the event through the API of radar interface 205, may receive the radar data and analyze the payload of the radar data to determine whether an object has been detected.

As processing image data is computationally expensive, object detector 215 may advantageously limit the amount of image data that is processed by using radar data corresponding to the image data. The radar data may be used, for example, to limit processing to the parts of the image data where an object is expected. For example, object detector 215 may map accessed radar data to accessed image data and only process the portions of the image data that correspond to an object detected in the accessed radar data. Object detector 215 may map radar data to image data using metadata related to the orientation and position of radar device 120 and camera 140. For example, when object detector 215 receives radar data from radar device 120 positioned on the rear of machine 110, it may map that radar data to image data from camera 140 that is also positioned on the rear of machine 110.

In addition to the orientation and position of radar device 120, the radar data may indicate a location within radar device's 120 field of view 130 where the object was detected. For example, the radar data may indicate the distance and angular position of the detected object. In some embodiments, object detector 215 may map the distance and angular position of the object in the radar data to a pixel location in the image data. The mapping may be accomplished through a look-up table where distances and angular positions for radar device 120 are linked to pixels of the images captured by camera 140. For example, a point at 5 meters, 25 degrees in radar device's 120 field of view may correspond to a pixel at (300, 450) in an image captured by camera 140. In some embodiments, radar interface 205 may map radar data to image data and the payload of the radar data may be expressed in pixels, as opposed to distance and angular position. The look-up table may be stored in a computer readable data store or configuration file that is accessible by object detector 215 or radar interface 205, and the look-up table may be configurable based on the position of each radar device and camera on machine 110 and the application of machine 110. Although a look-up table is one method by which object detector 215 or radar interface 205 may map radar data to image data, those skilled in the relevant art will appreciate that other methods for mapping radar data to image data may be used to achieve the same effect.

Object detector 215 may also process image data to detect objects within the image data. As indicated above, object detector 215 may only process a portion of the image data that has been mapped to radar data indicating the presence of an object. Object detector 215 may detect objects in the image by using edge detection techniques. For example, the object detector 215 may analyze the mapped image data for places where image brightness changes sharply or has discontinuities. Object detector 215 may employ a known edge detection technique such as a Canny edge detector. Although edge detection is one method by which object detector 215 may detect objects in images, those skilled in the relevant art will appreciate that other methods for detecting objects in image data may be used to achieve the same effect.

Although the exemplary object detector 215 of FIG. 2 uses radar data and image data to detect objects in the environment of machine 110, object detector 215 may use other object detection techniques known by those with skill in the art. For example, object detector 215 may use sound navigation and ranging (SONAR), light detection and ranging (LIDAR), radio-frequency identification (RFID) or global position satellite (GPS) data to detect objects in the environment of machine 110.

Image processing system 200 may also include alert processor 250. Once an object has been detected, alert processor 250 may analyze the object and state data received from machine interface 207 to determine if an alert needs to be generated. Alerts may be generated when a collision is likely to occur between the detected object and machine 110. Alerts may vary depending when the collision is likely to occur. For example, the alert processor 250 may generate a first alert that displays an indication of a detected object on a display 260 as soon as object detector 215 detects an object, but alert processor 250 may generate a second alert that makes a sound and flashes a warning when a detected object is about to collide with machine 110.

Alert processor 250 advantageously uses the state data of machine 110 in combination with detected object data to determine whether to generate an alert. Alert processor 250 may use the speed and direction of machine 110, obtained from machine interface 207, to determine the likely path of machine 110. After determining the likely path, alert processor 250 may determine whether any detected objects are in the likely path, and it may generate an appropriate alert, if necessary. For example, alert processor 250 may determine that machine 110 is moving along a straight path and that a detected object is along that straight path. Alert processor 250 may determine that if machine 110 does not change direction and if the detected object does not move, a collision is likely to occur in 10 seconds. Accordingly, alert processor 250 may generate an alert such as an audible warning. Alert processor 250 may also render a visual warning on display 260.

Image processing system 200 may include image processor 255. Image processor 255 may manipulate image data received from camera interface 206 and/or process the image data. Image processor 255 may, for example, combine the image data captured by cameras 140a-140d into a unified image. Image processor 255 may also select a portion of the unified image to render on display 260 and may generate overlays conveying contextual information on display 260. Display 260 is typically disposed in close proximity to the cabin of machine 110 and within the view of the operator of machine 110. Display 260 may be any display capable of rendering graphics generated by a general purpose computing system. For example, display 260 may be a LCD screen, LED screen, CRT screen, plasma screen, or some other screen suitable for use in machine 110. Display 260 may be connected to the processor of image processing system 200, and the processor may execute instructions to render graphics and images on display 260. The functionality of image processor 255 will now be discussed in greater detail with reference made to FIGS. 3-5.

Figure 3:
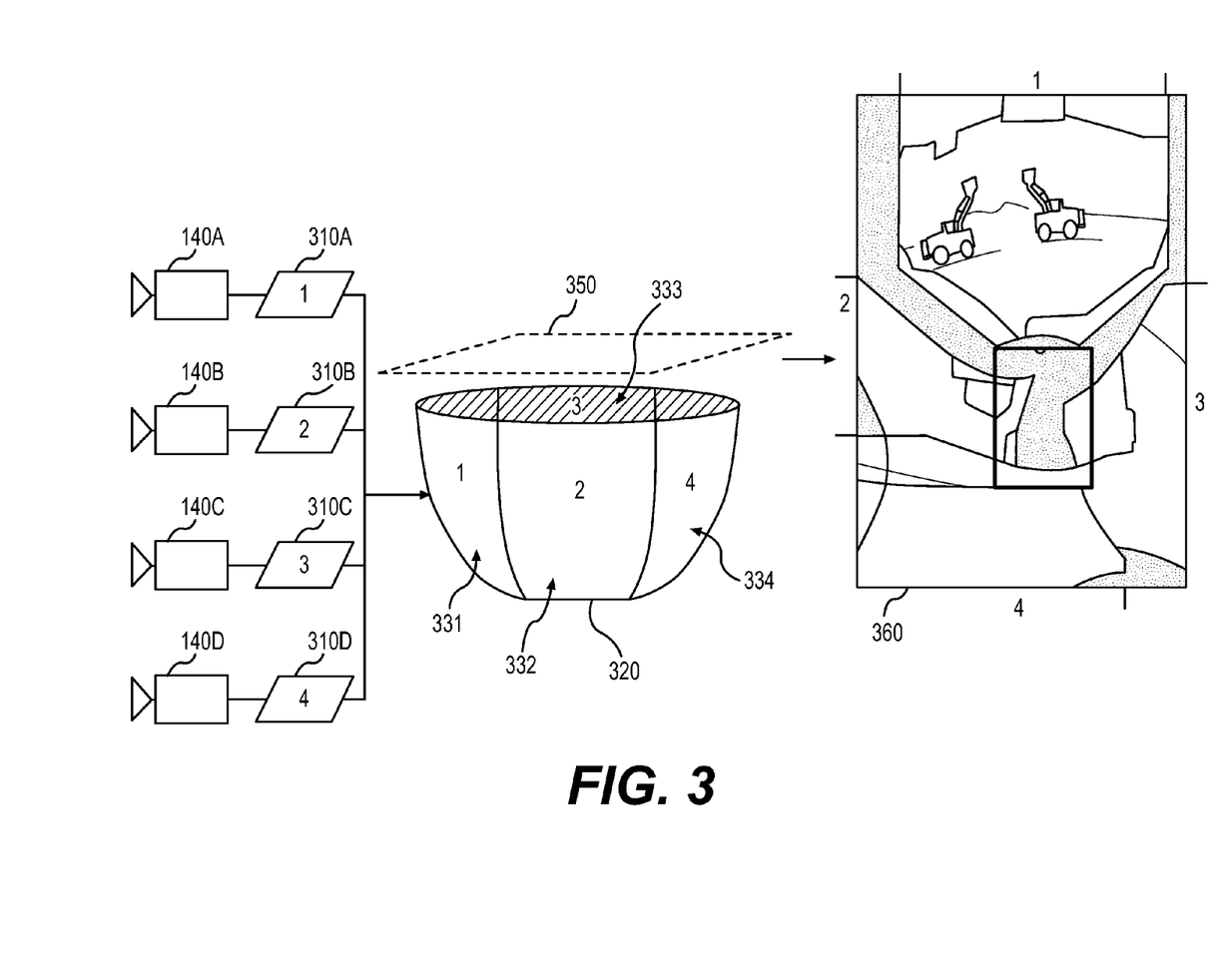
FIG. 3 is a pictorial illustration of an exemplary disclosed unified image generated by the image processing system of FIG. 2.

In some embodiments, image processor 255 may combine image data captured by cameras 140a-140d into unified image 320. FIG. 3 is a pictorial illustration of one example of image processor 255 combining source image data 310a-

310d to generate unified image 320. Unified image 320 may represent all image data available for the environment of machine 110. Conceptually, unified image 320 represents a 360-degree view of the environment of machine 110, with machine 110 at the center of the 360-degree view. According to some embodiments, unified image 320 may be a non-rectangular shape. For example, unified image 320 may be hemispherical and machine 110 may be conceptually located at the pole, and in the interior, of the hemisphere.

Image processor 255 may generate unified image 320 by mapping pixels of source image data 310a-310d captured by cameras 140a-140d to a pixel map. The pixel map may be divided into sections, with each section corresponding to one of source image data 310a-310d. For example, as shown in FIG. 3, first camera 140a captures source image data 310a which is mapped to section 331, second camera 140b captures source image data 310b which is mapped to section 332, third camera 140c captures source image data 310c which is mapped to section 333, and fourth camera 140d captures source image data 310d which is mapped to section 334. Pixels may be mapped directly using a one-to-one or one-to-many correspondence, and the mapping may correlate a two dimensional point from source image data 310a-310d to a three dimensional point on the map used to generate unified image 320. For example, a pixel of source image data 310a located at (1,1) may be mapped to location (500, 500, 1) of unified image. The mapping may be accomplished using a look-up table that may be stored in a computer readable data store or configuration file that is accessible by image processor 255. The look-up table may be configured based on the position and orientation of each camera on machine 110. Although a look-up table is one method by which image processor may map radar source image data 310a-310d to unified image 320, those skilled in the relevant art will appreciate that other methods for mapping radar data to image data may be used to achieve the same effect.

Image processor 255 may also use the parameters associated with cameras 140a-140d to map pixels from source image data 310a-310d to unified image 320. The parameters may be included in the metadata of source image data 310a-310d. For example, the parameters may include the position of each camera 140a-140d with respect to machine 110. Image processor 255 may correlate sections 331, 332, 333, 334 of unified image 320 with machine 110, and image processor 255 may use the correlations to determine which of source image data 310a-310d to map to each section. For example, image processor 255 may correlate section 331 with the front of machine 110. When image processor receives source image data 310a, the parameters included in the metadata associated with source image data 310a may indicate that it was captured by camera 140a. The parameters may also indicate that camera 140a is positioned on the front of machine 110. Image processor 255 analyzes the parameters and determines that source image data 310a should be mapped to section 331. Thus, as image processor 255 accesses source image data 310a-310d, it can correctly map it to sections 331, 332, 333, 334 of unified image 320.

The parameters associated with cameras 140a-140d may also include ranges of fields of view for each of cameras 140a-140d. The ranges may include the boundaries of the image with respect to machine 110 expressed as an angle from the down-vector of the camera and a distance. For example, camera 140b may capture images at a sixty-five degree angle from its down-vector for three hundred meters. As the ranges of fields of view of adjacent cameras may overlap, image processor 255 may use the ranges of fields of view to determine the amount of overlap. For example, camera 140b may be attached to the left side of machine 110 and camera 140c may be attached to the back of machine 110. The left side of the image captured by camera 140b may overlap with the right side of the image captured by camera 140c. Image processor 255 may use the parameters associated with camera 140b and camera 140c to determine how much overlap exists in the image data.

When multiple pieces of source image data overlap, a conflict arises as to which source image data will be used in unified image 320. In one embodiment, image processor 255 may resolve the conflict by using the parameters associated with the camera that captured the source image data, specifically, the priorities of the cameras for image processing. For example, image processor 255 may receive source image data 310c from camera 140c and source image data 310d from camera 140d. Camera 140c may correspond to the right side of machine 110 and camera 140d may correspond with the rear of machine 110. As a result, source image data 310c and source image data 310d may include some overlap. Image processor 255 may refer to the parameters associated with camera 140c and 140d and determine that camera 140d has a higher priority for image processing than camera 140c. Accordingly, image processor 255 may map pixels from source image data 310d to unified image 320 for the overlapping portion.

In some embodiments, the parameters associated with cameras 140a-140d may specify the mapping image processor 255 uses to create unified image 320. The mapping may be part of the configuration of cameras 140a-140d and may be stored in a configuration file, database, data store, or some other computer readable medium. For example, when source image data 310a is generated (for example, by camera interface 206), the mapping of the pixels of source image data 310a to the pixels of the map used to generate unified image 320 may be included in the parameters of the metadata for source image data 310a. Thus, when image processor 255 receives source image data 310a, it will simply map the pixels from source image data 310a to unified image 320 according to the mapping specified in the parameters. Such an arrangement may be beneficial where resources available to image processor 255 are limited.

According to some embodiments, image processor 255 may select a portion of the unified image 320 for rendering on display 260. The portion may be selected using viewpoint 350. Conceptually, viewpoint 350 represents a plane from which unified image 320 may be viewed, and the pixels located under the plane form the portion of unified image 320 that image processor 255 renders on display 260. For example, as shown in FIG. 3, viewpoint 350 is above all of unified image 320, and all of the pixels of unified image 320 are under viewpoint 350. As a result, image processor 255 selects all of the pixels of unified image 320 for rendering on display 260 resulting in display image 360.

Figure 4:
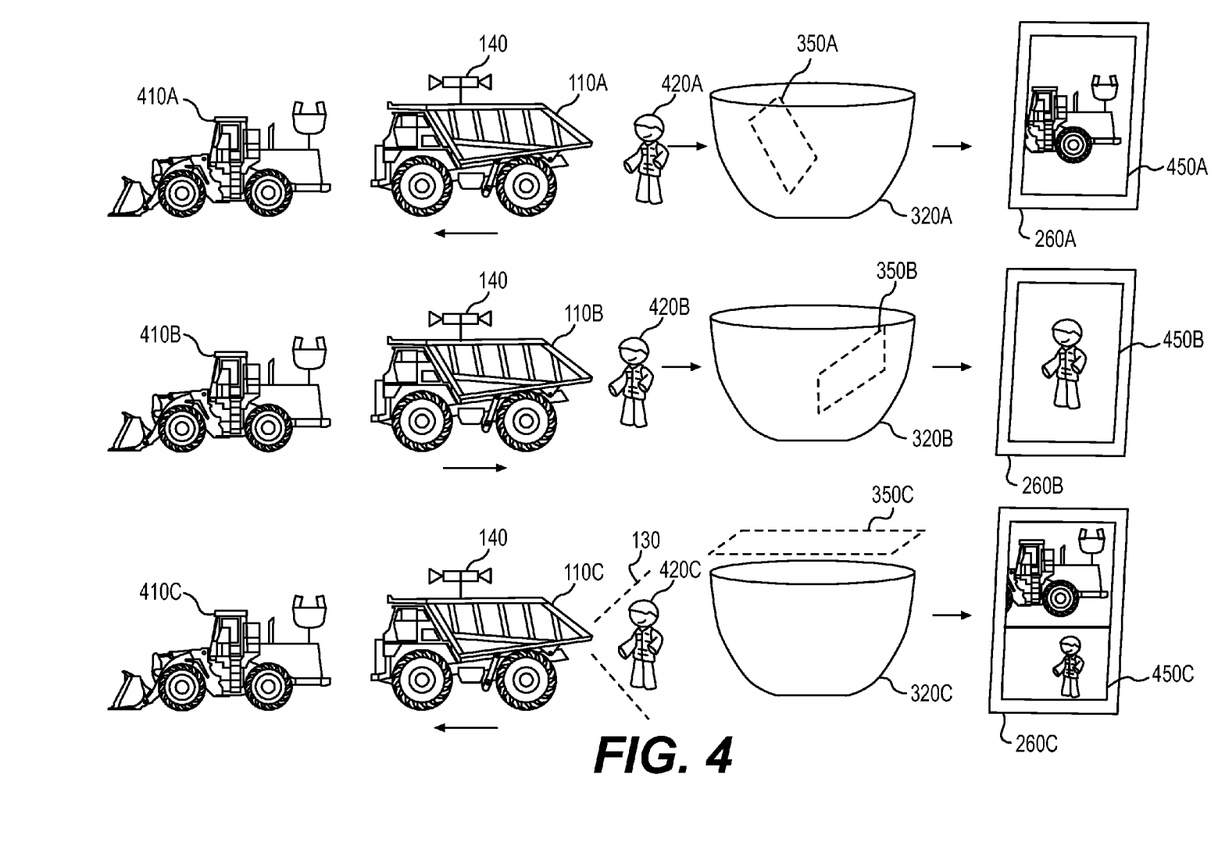
FIG. 4 is a pictorial illustration of several examples of portions of unified images rendered on several displays by the image processing system of FIG. 2.

In some embodiments, viewpoint 350 is rectangular and moves around unified image 320 depending on the state data of machine 110 and/or whether object detector 215 has detected any objects in the environment of machine 110. FIG. 4 illustrates three examples of portions of unified image 320 rendered on display 260. The portions rendered on display 260 vary depending on the position of viewpoint 350. The position of viewpoint 350 may be affected by the motion of machine 110, and whether an object has been detected in the environment of machine 110. In FIG. 4, the three examples are denoted by the letters A, B, and C, with elements having A following their number (such as machine 110a, display 260a, unified image 320a, viewpoint 350a, vehicle 410a, worker 420a, and rendered image 450a) corresponding to the first example, elements having B following their number corresponding to the second example, and elements having C following their number corresponding to the third example.

In Example A, machine 110a is moving forward. In front of machine 110a is vehicle 410a, and worker 420a is behind machine 110a. As machine 110a is moving forward, image processor 255 may access state data associated with machine 110a indicating forward motion. Image processor 255 may adjust viewpoint 350a toward the portion of unified image 320a corresponding with the front of machine 110a, that is, viewpoint 350a moves to the front of unified image 320a. Image processor 255 selects a portion of unified image 320a to render on display 260a by selecting the pixels of unified image 320a that are under the plane of viewpoint 350a. Image processor 255 may render the portion of unified image 320a on display 260a as rendered image 450a. Rendered image 450a includes vehicle 410a as it is in front of machine 110a.

In Example B, machine 110b is moving backward. In front of machine 110b is vehicle 410b, and worker 420b is behind machine 110b. As machine 110b is moving backward, image processor 255 may access state data associated with machine 110b indicating backward motion. Image processor 255 may adjust viewpoint 350b toward the portion of unified image 320b corresponding with the back of machine 110b, that is, the back of unified image 320b. Image processor 255 selects a portion of unified image 320b to render on display 260b by selecting the pixels of unified image 320b under the plane of viewpoint 320b. Image processor 255 may render the portion of unified image 320b on display 260b as rendered image 450b. Rendered image 450b includes worker 420b as he is behind machine 110b.

Example C provides an example of image processor 255 using state data of machine 110c and object detector 215 to adjust viewpoint 350c. In Example C, machine 110c is moving forward. Vehicle 410c is in front of machine 110c, and worker 420c is behind machine 110c. Image processor 255 may access state data of machine 110c that indicates forward motion. Image processor 255 may also receive data from object detector 215 indicating that an object, worker 420c, was detected in field of view 130 of a radar device located on the rear of machine 110c. Image processor 255 may then adjust viewpoint 350c to encompass the portions of unified image 320c corresponding to both the front and rear of machine 110c, that is, the front and rear of unified image 320c. Image processor 255 may select the portion of unified image 320c to render on display 260c by selecting the pixels of unified image 320c under viewpoint 350c. Image processor 255 may render the portion of unified image 320c on display 260c as rendered image 450c. Rendered image 450c includes vehicle 410c as it is the direction of motion of machine 110c and worker 420c as he was detected by object detector 215.

In some embodiments, as machine 110 traverses a work site, viewpoint 350 will adjust in response to the motion of machine 110. In addition, as objects enter the environment of machine 110 and are detected by object detector 215, viewpoint 350 may adjust to encompass the portions of unified image 320 corresponding to the detected object. Thus, at any given time, viewpoint 350 may be above any combination of source image data 310a-310d from cameras 140a-140d, and image processor 255 may select the corresponding portion of unified image 320 to render on display 260. As a result, image processor 255 advantageously offers an operator a single rendered image encompassing the portions of the environment of machine 110 that may be of interest to the operator. Thus, image processing system 200 provides awareness of those portions of the environment to the operator of machine 110, and the operator may operate machine 110 more safely.

In some embodiments, image processing system 200 may include display controls 261 (shown in FIG. 2). The operator may use display controls 261 to input his preference for viewing an area of the environment of the machine. Image processor 255 may render a portion of the unified image on display 260 based on the inputs received from the operator using display controls 261. In some embodiments, the display controls 261 may include buttons that allow an operator to select the portion of the unified image that image processing system 200 renders on the display. The buttons may be physical buttons located near display 260, or when display 260 is a touch screen, the buttons may be virtual buttons rendered by image processing system 200 on the touch screen. Using display controls 261, an operator may input his preference for the viewing area by expanding or shifting the portion of unified image 320 that is rendered on display 260. For example, image processing system 200 may render a portion of the unified image corresponding with the front of machine 110 as the machine 110 moves forward. The operator may use the display controls 261 to shift the portion to the left of machine 110. In some embodiments, display controls 261 may be used to display the entire unified image on display 260. For example, an operator may select a button providing a bird's-eye-view of the unified image, thereby showing the operator all image data from cameras 140a-140d at the same time.

In some embodiments, image processor 255 may generate one or more overlays to render on display 260. The overlays may provide information to the operator of machine 110 that helps the operator operate machine 110 more safely or more effectively. The overlays may include, for example, the projected path of machine 110 based on state data. Image processor 255 may determine the projected path of machine 110 based on state data accessed from machine interface 207. The state data may include, for example, the speed of machine 110 and the steering angle of machine 110. Image processor may use the speed and steering angle to create a predicted path. The predicted path may be mapped to unified image 320 and rendered on display 260.

Figure 5:
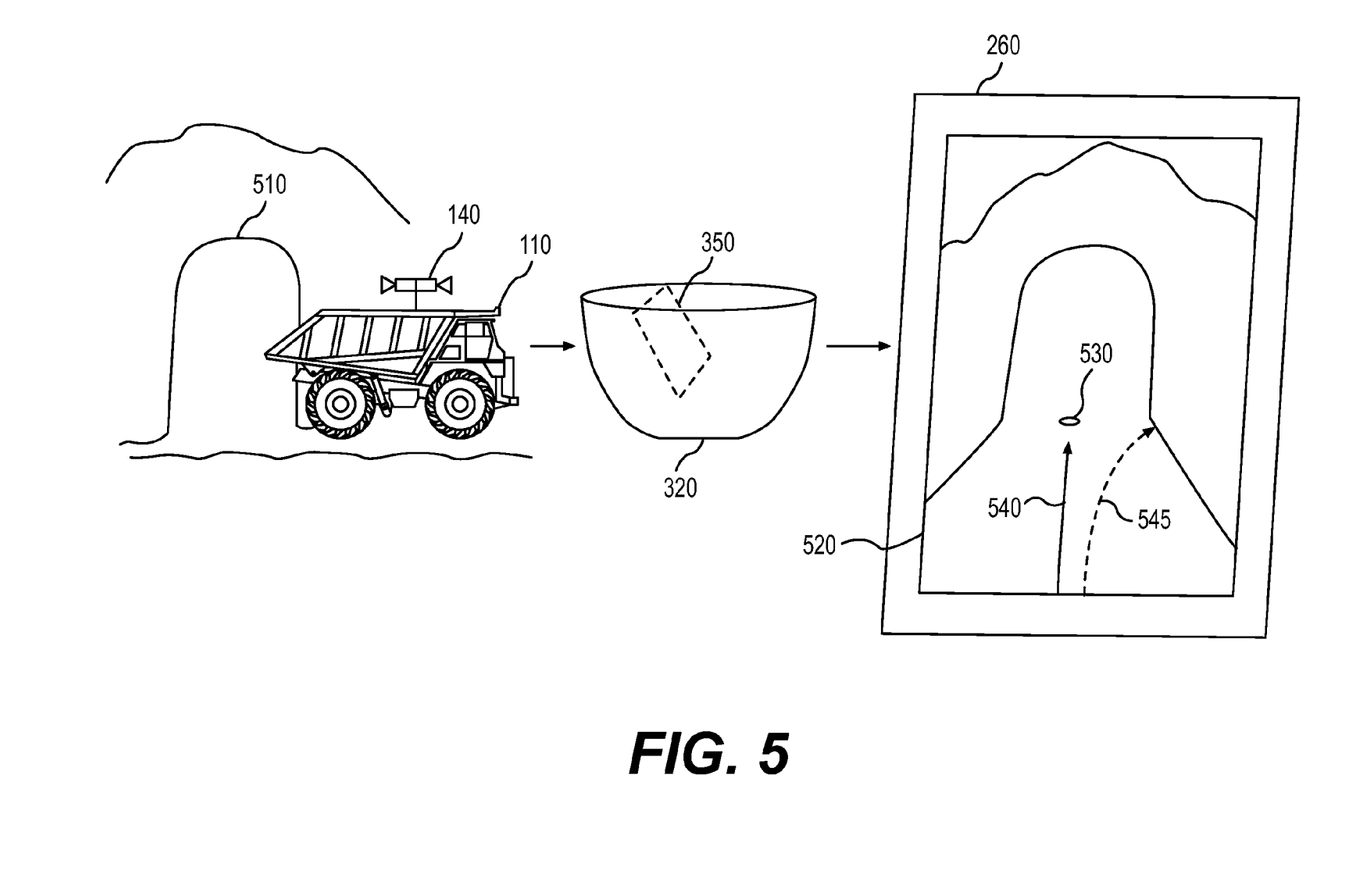
FIG. 5 is a pictorial illustration of an exemplary disclosed display showing a portion of a unified image with overlays that may be rendered by the image processing system of FIG. 2.

FIG. 5 is a pictorial illustration of one example of display 260 showing a portion of unified image 320 rendered on display 260 with target path overlay 540 and projected path overlay 545. In FIG. 5, machine 110 is backing into tunnel 510. As machine is moving backward, the state data associated with machine 110 may indicate backward motion. Image processor 255 may adjust viewpoint 350 to cover the portion of unified image 320 corresponding with the back of machine 110, and may render the portion of unified image 320 under viewpoint 350 as rendered image 520. Image processor 255 may also determine a predicted path using the state data associated with machine 110. The state data may indicate that machine 110 has a steering angle that is not straight and curving slightly to the right. As a result, image processor 255 may generate projected path overlay 545 showing the predicted path of machine 110 and render projected path overlay 545 on display 260.

Image processor 255 may also, in some embodiments, determine a target path for machine 110. The target path may be the best path from the current position of machine 110 to a destination target. Image processor 255 may determine the target path by first determining a straight path from machine 110 to a destination target. If the unified image 320 and/or radar data indicate the straight path is unobstructed, image processor 255 may render target path overlay 540 on display 260. For example, as shown in FIG. 5, destination target 530 is inside tunnel 510. Image processor 255 may have determined that the straight path to the destination target 530 was unobstructed, so it rendered target path overlay 540 on display 260. When image processor 255 determines the target path is obstructed, it may adjust the target path to circumvent any obstacles.

In some embodiments, the destination target may be a GPS coordinate that image processor 255 maps to unified image 320 based on the position of machine 110 and the position of the destination target. The destination target may also be a physical marker with specific characteristics that are detectable by object detector 215. For example, the physical marker may be a cone, barrel or flag with a unique shape known to object detector 215. In some embodiments, the operator of machine 110 can use display controls 261 to set the destination target that may be used by image processor 255 to determine the target path. In some embodiments, display 260 may include a touch screen and an operator may set a destination target by touching the touch screen at the location where the operator wants to place the destination target. In some embodiments, display controls 261 may include a joystick, mouse, light pen, arrow keys, or other directional control allowing the operator to manipulate a user interface element on display 260. After the operator moves the user interface element to the location for the destination target, she may press a button selecting that location as the destination target.

INDUSTRIAL APPLICABILITY

The disclosed image processing system 200 may be applicable to any machine that includes cameras. The disclosed image processing system 200 may enhance operator awareness by rendering a portion of a unified image on a display and selecting the rendered portion based on state data associated with machine 110 or objects detected in the environment or machine 110. The operation of image processing system 200 will now be explained.

Figure 6:
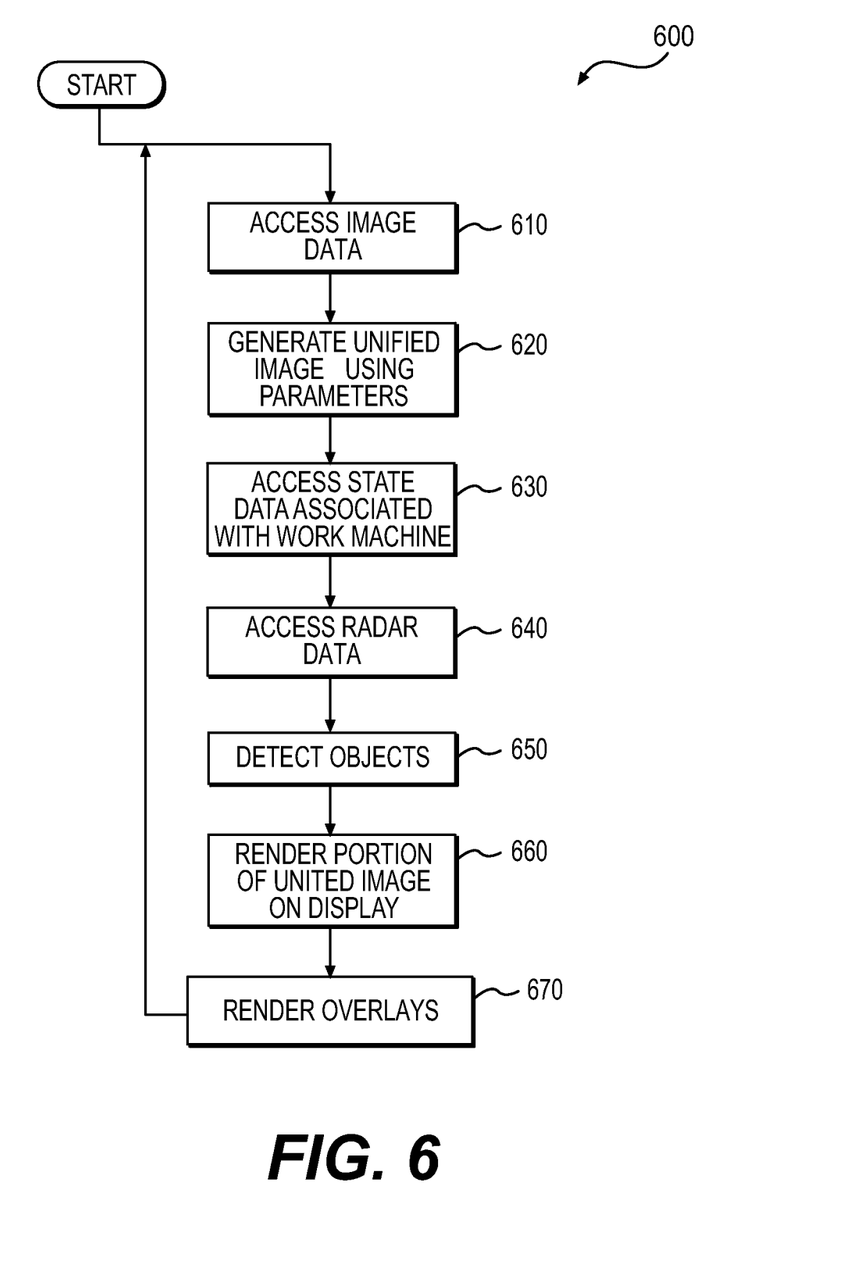
FIG. 6 is a flow chart illustrating an exemplary disclosed method that may be performed by the image processing system of FIG. 2.

FIG. 6 is a flow chart illustrating method 600 that may be performed by image processing system 200. During the operation of machine 110, image processing system 200 may perform method 600 by first accessing image data captured by cameras 140*a*-140*d*, at step 610. For example, image processing system 200 may access the image data of cameras 140*a*-140*d* through camera interface 206. The accessed image data may include a payload including a series of images captured by cameras 140*a*-140*d*, as well as metadata including parameters associated with each of cameras 140*a*-140*d*. The parameters may describe the orientation of the camera, the position of the camera with respect to machine 110, the down-vector of camera, and the range of the camera's field of view. For example, the parameters may indicate that a camera is located on the front of machine 110, or that the range of the camera's field of view is forty-five degrees from the down-vector of the camera. In some embodiments, the range of the camera's field of view may be expressed in pixel locations corresponding to the pixel map used to generate the unified image. The parameters associated with each camera may be used to generate a unified image at step 620.

Image processing system 200 may generate the unified image by combining the image data accessed from cameras 140*a*-*d*. Image processing system 200 may use a pixel map that maps pixels from the image data to pixel locations on a hemi-spherical pixel map which is used to generate the unified image, as described with respect to FIG. 3 above. The parameters may specify where the pixels from the image data are placed within the pixel map of the unified image. For example, image processing system 200 may map image data captured by a camera positioned on the front of machine 110 to the front of the unified image, image data captured by a camera positioned on the right side of machine 110 to the right side of the unified image, image data captured by a camera positioned on the left side of machine 110 to the left side of the unified image, and image data captured by a camera on the rear of machine 110 to the rear of the unified image. Image processing system 200 may also use the ranges of the cameras' fields of view to generate the unified image. It may use the ranges to prevent duplicates in the unified image, or to resolve conflicts when more than one pixel from the image data maps to a pixel location on the pixel map used to generate the unified image. For example, when the camera on the front of machine 110 and the camera on the right side of machine 110 have overlapping fields of view, image processing system 200 may select the camera on the front of machine 110 to provide the pixels in the unified image for the overlapping area. Image processing system 200 may also use the ranges of the fields of view to generate black-space or white-space pixels corresponding to regions in the environment of machine 110 that have not been captured by any of cameras 140*a*-140*d*.

Once image processing system 200 has generated the unified image, it may select a portion of the unified image to render on display 260. In some embodiments, image processing system 200 selects the portion to render based on state data associated with machine 110. At step 630, image processing system 200 accesses the state data associated with machine 110, which it may use to determine the portion of the unified image it will render on display 260. Image processing system 200 may access the state data from machine interface 207. The state data may include the direction of motion for machine 110, and image processing system 200 may use the direction of motion to select the portion of the unified image to render. For example, when machine 110 is moving forward, the state data may indicate machine 110 is moving forward. Image processing system 200 may select a portion of the unified image corresponding to the front of machine 110 to render on display 260. The selected portion may not include any image data received from cameras on the rear of machine 110, but the selected portion may include some of the image data from the cameras located on the left and right of machine 110. The state data may also indicate that machine 110 is not moving. When the state data indicates that machine 110 is not moving, image processing system 200 may select all of the unified image to render on display, that is, the selected portion of the unified image is the entire unified image.

In some embodiments, image processing system 200 may select the portion of the unified image to render on display 260 based on whether any objects are in the environment of machine 110. Accordingly, image processing system 200 may include radar devices 120*a*-120*h* to detect objects. At step 640, image processing system 200 accesses radar data from radar devices 120*a*-120*h*, and at step 650, it may analyze the radar data to detect objects. In some embodiments, image processing system 200 may analyze image data to detect objects. When an object is detected, image processing system 200 may select a portion of the unified image to display such that a detected object is included in the portion. For example, if image processing system 200 detects an object on the right side of machine 110, the portion of the unified image selected for rendering on display 260 would include the right side of the unified image. When the state data of machine 110 indicates motion and image processing system 200 detects an object, image processing system 200 may select a portion of the unified image to render that includes both the environment that is in the direction of motion and the detected object. For example, when the state data indicates machine 110 is backing up and image processing system 200 detects an object on the left side of machine 110, the portion of the unified image selected to render on display 260 may include both the rear of machine 110 and the left side of machine 110.

At step 660, image processing system 200 renders the selected portion of the unified image on display 260. Image processing system 200 may also, at step 670, render overlays on top of the rendered portion of the unified image. For example, image processing system 200 may render an overlay showing a predicted path of machine 110 that it has determined based on the state data associated with machine 110. Image processing system 200 may also render a target position and a determined target path that may assist an operator of machine 110 direct it to the proper location for completing a task. Overlays may also include, for example, warnings regarding objects in the path of machine 110 that may cause a collision or indications reflecting detected objects in the environment of machine 110.

Several advantages over the prior art may be associated with the image processing system 200. For example, image processing system 200 provides enhanced awareness to operators of machine 110 by creating a unified image and rendering a portion of the unified image on display 260 within machine 110. In addition, image processing system 200 may access state data associated with machine 110 and use the state data to select the portion of the unified image it renders on display 260 within machine 110. Image processing system 200 may also utilize object detector 215 configured to detect objects within the environment of machine 110, and it may select the portion of the unified image to display such that any detected object is included within the selected portion.

It will be apparent to those skilled in the art that various modifications and variations can be made to the disclosed image processing system. Other embodiments will be apparent to those skilled in the art from consideration of the specification and practice of the disclosed image processing system. It is intended that the specification and examples be considered as exemplary only, with a true scope being indicated by the following claims and their equivalents.

What is claimed is:

1. An image processing system comprising:
a plurality of cameras mounted on a machine, the plurality of cameras configured to generate image data for an environment of the machine;
a display mounted on the machine;
a processor connected to the plurality of cameras and the display, the processor configured to:
access the image data from the plurality of cameras;
access parameters associated with the plurality of cameras, the parameters including a plurality of image boundaries expressed as one or more angles from one or more down-vectors of the cameras;
generate a unified image by combining the image data from the plurality of cameras based at least in part on the parameters;
access state data associated with the machine;
select a portion of the unified image based at least in part on the state data; and
render the selected portion of the unified image on the display.

2. The image processing system of claim 1, wherein the state data includes a direction of the machine's motion and wherein selecting the portion of the unified image is based at least in part on the direction of the machine's motion.

3. The image processing system of claim 1, wherein the state data includes an indication that the machine is not in motion and wherein the selected portion of the unified image includes all of the unified image.

4. The image processing system claim 1, wherein:
the processor is further configured to detect an object in the environment of the machine; and
the selected portion of the unified image includes the detected object.

5. The image processing system of claim 4, wherein the processor is further configured to generate an alert when a collision is likely to occur between the detected object and the machine.

6. The image processing system of claim 1, further comprising:
a radar device mounted to the machine and configured to generate radar data; and
wherein the processor is further configured to:
access the radar data from the radar device; and,
detect an object in the accessed radar data, and
wherein the selected portion of the unified image includes the detected object.

7. The image processing system of claim 1, wherein the parameters include a position of the plurality of cameras with respect to the machine.

8. The image processing system of claim 1, wherein the unified image data is mapped to a hemi-spherical image map.

9. The image processing system of claim 1, wherein the selected portion of the unified image is rectangular.

10. The image processing system of claim 1, wherein:
the processor is further configured to detect an input describing an operator preference for viewing an area of the environment of the machine, and
the selected portion of the unified image includes the area of the environment.

11. A method for displaying an image comprising:
accessing image data from a plurality of cameras mounted on a machine;
accessing parameters associated with the plurality of cameras, the parameters including a plurality of image boundaries expressed as one or more angles from one or more down-vectors of the cameras;
generating a unified image by combining the image data from the plurality of cameras based on the parameters;
accessing state data associated with the machine;
selecting a portion of the unified image data based at least in part on the state data; and
rendering the selected portion of the unified image on a display mounted on the machine.

12. The method of claim 11, wherein the state data includes a direction of the machine's motion and wherein selecting the portion of the unified image is based at least in part on the direction of the machine's motion.

13. The method of claim 11, wherein the state data includes an indication that the machine is not in motion and wherein the selected portion of the unified image includes all of the unified image.

14. The method of claim 11 further including detecting an object in an environment of the machine and wherein the selected portion of the unified image includes the detected object.

15. The method of claim 11, further including:
accessing radar data from a radar device mounted on the machine; and
detecting an object an environment of the machine using the radar data,
wherein the selected portion of the unified image includes the detected object.

16. The method of claim 11, wherein the parameters include a position of the plurality of cameras with respect to the machine.

17. The method of claim 11, wherein the unified image data is mapped to a hemi-spherical image map.

18. The method of claim 11 wherein the selected portion of the unified image is rectangular.

19. The method of claim 11, further including: detecting an input describing an operator preference for viewing an area of an environment of the machine and wherein the selected portion of the unified image includes the area of the environment.

20. A machine comprising:
   a cabin,
   a display disposed within the cabin;
   a frame;
   a plurality of cameras connected to the frame, the plurality of cameras configured to generate image data for an environment of the machine;
   a processor in communication with the plurality of cameras and the display, the processor configured to:
      access the image data from the plurality of cameras;
      access parameters for the plurality of cameras, the parameters including a plurality of image boundaries expressed as one or more angles from one or more down-vectors of the cameras;
      generate a unified image by combining, based on the parameters, the image data from the plurality of cameras;
      detect an object in the environment of the machine;
      access state data describing associated with the machine, the state data including a direction of the machine's motion;
      select a portion of the unified image based at least in part on the state data and a location of the detected object; and,
      render the selected portion of the unified image on the display.

* * * * *